United States Patent [19]

Hill

[11] 3,718,366
[45] Feb. 27, 1973

[54] METHOD FOR CREATING PERMEABILITY IN SULFUR DEPOSITS

[75] Inventor: William L. Hill, Richardson, Tex.

[73] Assignee: Continental Oil Company, Ponca City, Okla.

[22] Filed: Oct. 7, 1970

[21] Appl. No.: 78,977

[52] U.S. Cl. ..........................299/4, 102/21, 166/299
[51] Int. Cl. .........................E21b 43/26, E21b 43/28
[58] Field of Search.......................299/4, 6; 166/259–271, 299; 102/21, 23

[56] References Cited

UNITED STATES PATENTS

| | | | |
|---|---|---|---|
| 3,075,463 | 1/1963 | Eilers et al. | 166/299 |
| 3,270,815 | 9/1966 | Osborn et al. | 166/299 |
| 3,018,095 | 1/1962 | Redlinger | 299/4 X |
| 3,058,730 | 10/1962 | Bays | 299/4 |
| 3,593,793 | 7/1971 | Kelseaux | 166/299 |

*Primary Examiner*—Ernest R. Purser
*Attorney*—Joseph C. Kotarski, Henry H. Huth, Robert B. Coleman, Jr., Gerald L. Floyd and Carroll Palmer

[57] ABSTRACT

Permeability of a subterranean sulfur containing formation is increased and production of sulfur by underground fusion mining of sulfur (wherein hot water is injected into the sulfur containing formation, molten sulfur is produced from a lower level, and excess water is removed through an outlying bleed well) is improved according to the method of this invention by fracturing between a production well and a water bleed well, injecting a fluid explosive into the fracture, and detonating the explosive.

5 Claims, No Drawings

… (3,718,366)

METHOD FOR CREATING PERMEABILITY IN SULFUR DEPOSITS

FIELD OF THE INVENTION

This invention relates to sulfur mining.

DESCRIPTION OF THE PRIOR ART

Underground fusion mining of sulfur according to the Frasch process and modifications thereof is well known. According to one widely used process for fusion mining of subterranean sulfur containing formations, hot water is injected into a subterranean sulfur containing formation. Sulfur which becomes molten by heating from the hot injection water pools in a molten zone below the hot water injection zone. This molten sulfur is produced. As the underground water and sulfur are essentially noncompressible, water is forced through the subterranean sulfur containing formation and is removed by outlying bleed wells to compensate for the hot water injected.

While the Frasch process has been widely used, and a large proportion of the sulfur mined is produced by this method, certain disadvantages are evident. Thus, the rate of water injection and consequent production of molten sulfur is often limited by the rate of withdrawal by the bleed wells which in turn is limited by the permeability of the sulfur containing formation.

SUMMARY

An object of this invention is to increase permeability of subterranean sulfur containing formations.

Another object of this invention is to increase the rate of subterranean fusion mining of sulfur.

Other objects and advantages of the invention are evident from the following description.

According to this invention, the rate of production of molten sulfur by subterranean fusion mining is increased by increasing the permeability of a sulfur containing formation between a production well for molten sulfur and an outerlying bleed well by producing a fracture between the producing well and the water bleed well, injecting a fluid explosive into the fracture, and detonating the explosive.

The fracture produced between the producing well and the water bleed well can be formed by any means presently known for producing fractures of underground strata.

According to one presently preferred embodiment, a fracture is produced between a producing well and a water bleed well by injecting into the subterranean sulfur containing formation from the water bleed well a fluid at a sufficient pressure to hydraulically fracture the sulfur containing formation from the water bleed well to the production well. Completion of the fracture between the bleed well and the production well is readily determined by flow of the fracturing fluid into the production well.

According to another presently preferred embodiment, a fracture is produced between a producing well and a water bleed well by injecting into the subterranean sulfur containing formation from the production well a fluid at a sufficient pressure to hydraulically fracture the sulfur containing formation from the production well to the water bleed well.

Alternatively, according to another presently preferred embodiment, sufficient explosives can be placed and detonated in the well bore of the production well within the sulfur formation to fracture the formation between the production well and the water bleed well, or explosives can be placed and detonated in the sulfur formation in both the water bleed well and the production well to fracture the sulfur formation therebetween.

A combination of means of fracturing can also be employed. For example, explosives can be placed in the well bore of the production well within the sulfur bearing formation and the explosives detonated to fracture a zone around the production well. Subsequently, fluid can be injected in the water bleed well to fracture the sulfur formation from the water bleed well to the fractured zone surrounding the production well produced by the explosive detonation.

When fracturing of the sulfur formation is produced by hydraulic means, that is, by high pressure injection of a fluid, preferably, the fracture is propped by means of a conventional propping agent to prevent closure of the fracture upon release of the pressure upon the hydraulic fracturing fluid.

Subsequent to fracturing the sulfur containing formation between the water bleed well and the production well, according to this invention, a fluid explosive is injected into the fracture. Any conventional fluid explosive can be employed. Preferably, fluid explosives which are capable of propagating an explosion in fissures as small as 0.5 inch in width are employed. For example, materials such as amine sensitized nitromethane or desensitized nitroglycerin are presently preferred liquid explosives for injection according to this invention. A sufficient amount of fluid explosive should be injected into the fracture by means of the production well, by means of the water bleed well, or by means of both the production well and the water bleed well, to substantially completely extensively fracture the sulfur bearing formation therebetween and provide a high degree of permeability upon detonation thereof.

According to this invention, upon injection of the fluid explosive into the fracture, the explosive is detonated to extensively fracture the subterranean sulfur containing formation. Detonation can be by any conventional means, such as by use of dynamite caps and booster charges, squibs and boosters, injection of a hypergolic fluid such as fuming nitric acid so as to contact the fluid explosive, or the like.

Following extensive fractionation of the sulfur formation between the production well and the water bleed well, production of molten sulfur by injection of hot water, withdrawal of molten sulfur from the production well, and withdrawal of excess water from means of the water bleed well is implemented with substantially increased production due to the greatly increased permeability of the sulfur containing formation.

Although the process of this invention has been described referring to a production well and a bleed well in the singular, it is to be understood that a plurality of production wells and bleed wells are often employed in the mining of sulfur by underground fusion. Thus, the process of this invention includes also the increasing of permeability between one or more production wells and one or more bleed wells either concurrently or in sequence.

EXAMPLE

A converging concavo-convex lense-shaped sulfur containing deposit having the convex surface uppermost of the type sometimes found above salt domes is penetrated by a plurality of bore holes and found by corings to have substantially uniform composition and permeability throughout.

At a position near the center of the deposit a production well is completed. A bleed well is drilled into the deposit between the production well and the outer perimeter at a distance of about 150 feet from the production well.

Hot water is injected into the deposit by means of the production well. Sulfur is melted and flows downward collecting in a pool near the bottom of the production well. Molten sulfur is then pumped to the surface by means of the production well.

As the molten sulfur does not equal the volume of the hot water injected, excess water volume is removed from the sulfur deposit by means of the bleed well after penetrating thereto from the injection zone. The rate of production is considerably limited by the relatively low permeability of the sulfur containing deposit in the region between the production and bleed-well.

At a position on a line drawn from the first production well across the center of the deposit and approximately 300 feet from the first production well, a second production well is completed which is like the first production well. A second bleed well substantially identical to the first bleed well is completed at a position 150 feet from the second production well on a line between the second production well and the outer perimeter of the deposit. Thus, a production situation substantially like the production situation of the first production well and first bleed well is created in the region between the second production well and the second bleed well.

According to this invention, a mixture of water jelled with quar gum with added finely divided sand (< 325 US mesh) fluid loss additive is forced into the sulfur bearing deposit from the second production well at a rate of 30 barrels per minute. A fluid volume of about 30,000 gallons of the injection fluid is employed to create a horizontal fracture through the sulfur bearing deposit having a radius of about 150 feet from the production well and having an effective fracture width of about 0.4 inches. The fracture is formed from the second production well to the second bleed well.

A total of about 65,000 pounds of 20-40 US mesh sand is then injected into the fracture in the latter portion of the fracturing fluid to prop the fracture. A flow channel is thus maintained through the propped fracture from the second production well to the second bleed well when the fracturing pressure is released.

The propped horizontal fracture having a fracture thickness of about 0.1 inch and extending in a radius of about 150 feet from the second production well to the second bleed well has a volume of about 8,840 gallons without the sand propping agent. The sand propping agent utilizes about 70 percent of the void space. Thus, the void space remaining in the horizontal fracture is about 2,652 gallons.

A total of about 2,652 gallons of a fluid explosive comprising an amine sensitized nitromethane is pumped into the second production well. Water is employed to displace the fluid explosive from the well bore above the sulfur deposit and inject the fluid explosive into the propped horizontal fracture.

A booster charge comprised of 8 quarts of nitroglycerin with dual timers and detonators is then placed in the well bore near the explosive filled fracture.

Subsequent to detonation of the fluid explosive, the production well bore is cleaned. A highly fractured zone extends from the second production well to the second bleed well.

Hot water is injected into the deposit by means of a second production well. Sulfur is melted and flows downward collecting in a pool near the bottom of the second production well. Sulfur is pumped to the surface by means of the second production well. It is noted that the rate of sulfur recovery is substantially increased in comparison to the first production well since the permeability to water flow between the second production well and the second bleed well is greatly increased by the extensive fracturing produced by the detonation of the fluid explosive as compared to the permeability between the first production well and the first bleed well wherein no fracturing is produced.

Having thus described the invention, what is claimed is:

1. In the mining of sulfur by underground fusion comprising: injecting hot water into the sulfur containing formation, producing molten sulfur melted by the hot water to the surface by means of a production well, and removing excess injected water from the sulfur containing formation by means of an outlying water bleed well to compensate for the volume of water injected in excess of the volume of molten sulfur produced; the improvement comprising:
   a. fracturing between the producing well and the water bleed well to open a passage therebetween,
   b. injecting a fluid explosive selected from the group consisting of amine sensitized nitromethane and desensitized nitroglycerine into the fracture, and
   c. detonating the explosive to extensively fracture and impart high permeability to the zone between the producing well and the water bleed well.

2. The method of claim 1 wherein the fracturing in (a) is by hydraulic means.

3. The method of claim 1 wherein the fracturing in (a) is by detonation of explosives.

4. The method of claim 1 wherein the fracturing in (a) is by injection of an aqueous fluid at high pressure and the fluid explosive injected in (b) is an amine sensitized nitromethane.

5. The method of claim 4 wherein the subterranean sulfur containing formation is propped with a propping agent subsequent to injection of the high pressure aqueous fluid and prior to injection of the fluid explosive.

* * * * *